United States Patent
Werner

(12) 
(10) Patent No.: US 6,819,395 B2
(45) Date of Patent: Nov. 16, 2004

(54) DIGITAL CINEMA TRANSPORT STREAM WITH EMBEDDED PROJECTOR CONFIGURATION DATA

(75) Inventor: William B. Werner, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/231,997

(22) Filed: Aug. 30, 2002

(65) Prior Publication Data

US 2004/0041981 A1 Mar. 4, 2004

(51) Int. Cl.[7] .......................... G03B 19/18; H04N 7/18
(52) U.S. Cl. ................................. 352/40; 725/74
(58) Field of Search .......................... 352/40, 41, 92, 352/123; 725/74, 78, 105

(56) References Cited

U.S. PATENT DOCUMENTS

2002/0095679 A1 * 7/2002 Bonini ................. 725/74
2002/0163676 A1 * 11/2002 Jones et al. .......... 358/505

* cited by examiner

*Primary Examiner*—Rodney Fuller
*Assistant Examiner*—Arthur A Smith
(74) *Attorney, Agent, or Firm*—Charles A. Brill; Wade James Brady, III; Frederick J. Telecky, Jr.

(57) ABSTRACT

A transport stream with embedded projector configuration data 208 being carried along with the video for use in digital cinema projector setup. The embedded configuration data consists of sub-packets 304 of setup data information for such parameters as gamma tables, color management system information, relative luminance level, format and range of the sampled data, 3D/2D presentation information, frame rate, image size, aspect ratio, font tables, and language provision. This approach assures that the projector 404 is setup properly and also permits on-the-fly changes to the projector's parameters, which may be used for artistic effects in the movie.

29 Claims, 2 Drawing Sheets

DIGITAL CINEMA TRANSPORT STREAM WITH EMBEDDED PROJECTOR CONFIGURATION DATA

FIELD OF THE INVENTION

The present invention relates to digital cinema projection systems and particularly to setting up the systems to the authored reference configuration state.

BACKGROUND OF THE INVENTION

Currently, movie material is digitized from film or digitally created based on a given projector configuration. The distributed data is authored using a review projector with a given set of characteristics. The setup information for the reference monitor is often different for each movie transfer. As a result, during playback each projector must be appropriately configured to match the characteristics of the reference system or the appropriate compensation must be applied to the incoming data, based on the given performance level of the playback system. A skilled technician is required to properly setup each system prior to playback, thereby introducing the possibility for improperly configured projector systems.

FIG. 1 is a drawing of a typical prior art packet structured transport stream used in digital cinema projectors. This consists of a continuous stream of video picture data 100, 102, 104, 106, 110, 112, 114, 116, and 120, 122 with audio data 108, 118 being periodically interspersed into the stream. This data gets presented based on the setup of the projector and as a result, the possibility exists for the picture to appear differently from projector to projector, depending on the various projectors' setup.

What is needed is a fail-safe way to assure that each projector is setup to match the performance of the reference system used by the media author in creating the film. The disclosed approach accomplishes this by embedding the projector configuration data in the transport stream along with the video content. This assures that each projector is setup properly and that any special effects, which may occur on a frame-by-frame basis, are presented according to the author's intentions.

SUMMARY OF THE INVENTION

The present invention discloses a transport stream with embedded projector configuration data being carried along with the video for use in digital cinema projector setup. The embedded configuration data includes setup information for such parameters as gamma tables, color management system, intended luminance level, format and range of the sampled data, 3D/2D presentation information, frame rate, image size, aspect ratio, font tables, and language provision.

Embedding the setup data in the content transport stream eliminates the need for skilled on-site personnel to properly configure the projector before each performance to assure that the projector is setup according to the film author's desires, and it greatly reduces the possibility that the projector is improperly configured for the content being delivered. It also minimizes the possibility of errors being present in the configuration data. This approach also permits on-the-fly changes to the projector's frame rate and other parameters, which may be used for artistic effects, or to reduce temporal aliasing (judder) in the image. In addition, it enables a proprietary image characteristic look desired by some filmmakers.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

The present invention discloses a transport stream with embedded projector configuration data being carried along with the video for use in digital cinema projector setup. The embedded configuration data includes setup information for such parameters as gamma tables, color management system, intended luminance level, format and range of the sampled data, 3D/2D presentation information, frame rate, image size, aspect ratio, font tables, and language provision.

Embedding the setup data in the content transport stream eliminates the need for skilled on-site personnel to properly configure the projector before each performance and greatly reduces the possibility that the projector is improperly configured for the content being delivered. It also minimizes the possibility of errors being present in the configuration data. This approach also permits on-the-fly changes to the projector's frame rate and other parameters, which may be used for artistic effects, or to reduce temporal aliasing (judder) in the image. In addition, it enables the proprietary image characteristic look desired by many filmmakers.

Figure 1:
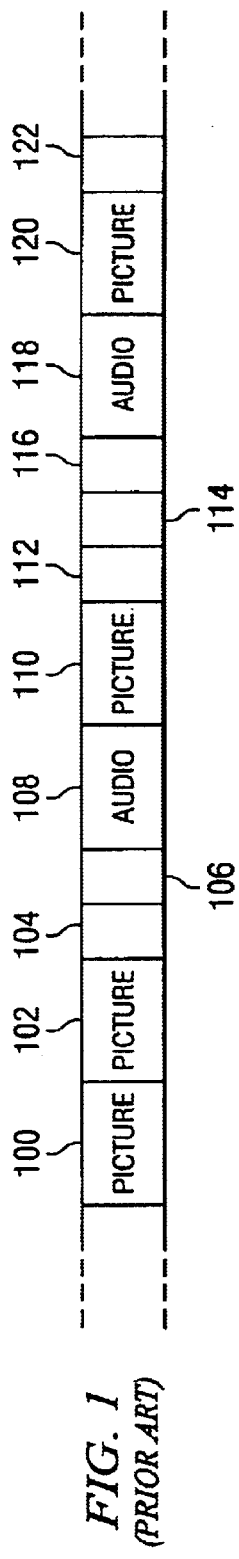
FIG. 1 is a drawing of a typical packet structured transport stream used in digital cinema projectors.
Figure 2:
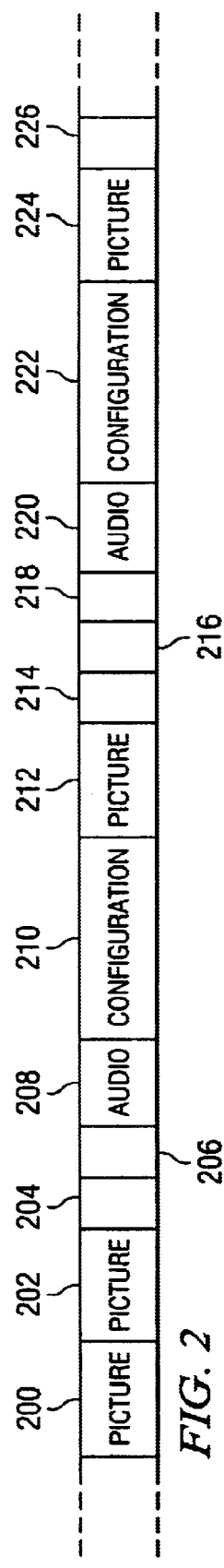
FIG. 2 is a drawing of the packet structured transport stream of the present invention, for use in digital cinema projectors.

FIG. 2 is a drawing of the packet structured transport stream of the present invention, which embeds the configuration data in the transport stream. As with the conventional transport stream of FIG. 1, this has multiple picture frames 200, 202, 204, 206, 212, 214, 216, 218, 224, 226 with audio data 208, 220 inserted, but in addition configuration data 210, 222 is also inserted into the stream. This not only assures proper setup of every projector, but it opens up a whole arena of proprietary artistic possibilities that the film provider can utilize.

Figure 3:
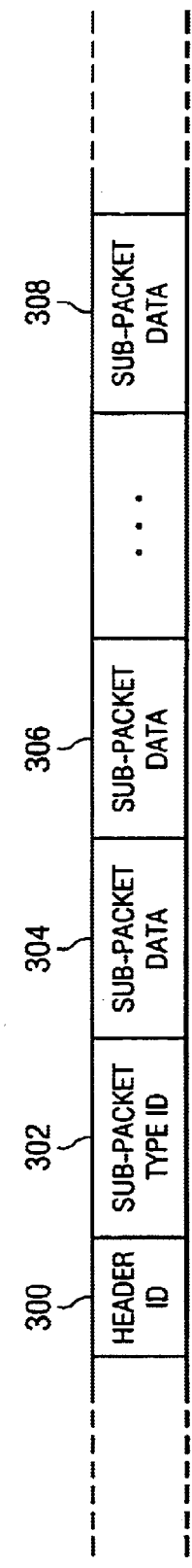
FIG. 3 is a drawing of the digital cinema transport stream of the present invention, showing the configuration packet structure.

FIG. 3 is a drawing of the digital cinema transport stream of the present invention showing the configuration packet 210, 222 structure, which is embedded in the input data stream of a digital cinema projection system. The configuration packet consists of a configuration packet header/ID 300, sub-packet type ID 302, and multiple sub-packet data blocks 304, 306, 308. The packet header/ID 300 identifies the packet. The sub-packet type ID 302 identifies the type of data included in the sub-packet data blocks 304–308 to follow. These can include such parameters as gamma tables, color management system information, intended luminance or relative luminance level, format and range of the sampled data, 3D/2D presentation information, frame rate, image size, aspect ratio, font tables, and language provision. The sub-packet data blocks 304–308 contain the actual data needed for setup of each included projector parameter.

This sub-packet data relates to, but is not limited to, the following parameters:

(1) Gamma tables
   Standard video
   Log
   Linear
   Custom; unique to give a particular look and feel to a movie.
(2) Color management system
   Color temperature
   Color primaries of encoded image data
   3D color look-up-table (LUT) data that can enable different image characteristics (may be proprietary data) that may emulate various film presentation attributes (prior art), such as
      Conventional film look,
      Skip bleach-processing look—used to create a faded or historical feel, such as was done in "Saving Private Ryan," and
      Dye transfer-processing look.
(3) Intended projector relative luminance level for controlling lamp modulation.
(4) Sampling format image data
   RGB
   YCrCb
   4:2:2 chroma sampling
   4:4:4 chroma sampling
   4:2:0 chroma sampling.
(5) 3D/2D presentation information
   Headers
      2D frame
      3D frame
         Left-eye frame
         Right-eye frame
   Flags.
(6) Frame rate, with provision to change frame rate on-the-fly.
(7) Sampled image size
   Number of horizontal pixels
   Number of vertical pixels.
(8) Aspect ratio
   Image aspect ratio (e.g., 1.85:1, 2.39:1, 16:9, etc.)
   Pixel aspect ratio (e.g., 1:1, 1080:1035, etc.)
(9) Subtitling font tables
   Selection from standard font set
   Definition of custom font set
(10) Language provision Currently the projector setup for these parameters is performed by a skilled technician prior to each performance. Embedding the setup data in the content eliminates the need for skilled on-site personnel to properly configure the projector before each performance, and greatly reduces the possibility that the projector is improperly configured for the content being delivered. It can be used to minimize the existence of errors in the configuration data and reduces artifacts in the projected image, such as temporal aliasing (judder). This approach also permits on-the-fly changes to projector operational parameters, such as frame rate, which may be used for artistic effects; e.g., conventional 35 mm film look, video look, and historical silent film look at 16 frames per second.

Figure 4:
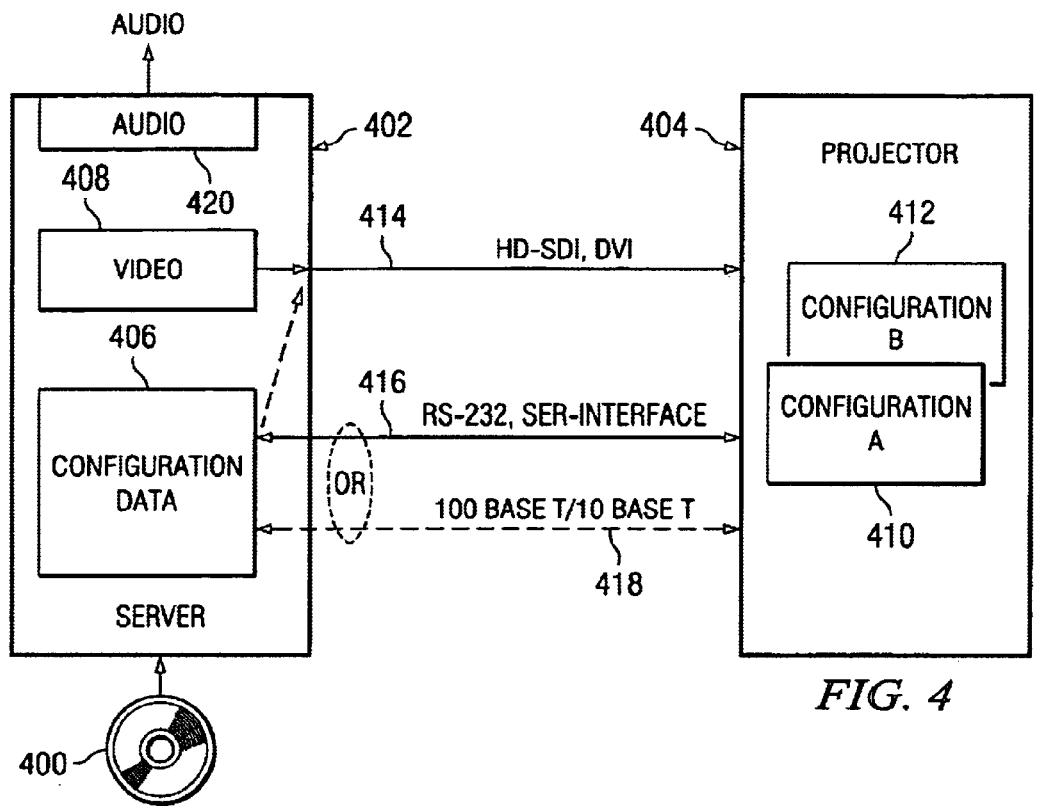
FIG. 4 is a block diagram of a digital cinema projection system, which incorporates the transport stream with embedded projector configuration data of the present invention.

FIG. 4 is a block diagram of a digital cinema projection system, which incorporates the transport stream with the embedded projector configuration data of the present invention. This is comprised of a media source 400, a server 402, a projector 404, and interconnecting interfaces 414/416 or 418.

The media source 400 includes, but is not limited to, optical media (e.g., DVDROM, DVD-R, DVD-RAM), digital videotape, satellite transmission, telecommunications feed, and terrestrial broadcast. This input is coupled to the server 402, which supplies configuration data 406, video 408, and audio 420 to the system. The projector 404 has a double-buffered memory configuration, Config A 410 and Config B 412, which holds the current and the next configuration packet data, as described in FIG. 3.

The configuration data 406 can be provided to the projector 404 by means of a standard communications interface, such as Ethernet, fiber channel, RS-232, RS-422, etc. The video 408 can be provided to the projector 404 by means of a high-definition (high bandwidth) serial digital interface (HD-SDI), such as SMPTE 292 or an industry standard DVI interface developed by the Digital Display Working Group (DDWG). For example, with the high-definition serial digital interface, video 408 is sent to the projector via a coaxial cable 414 while configuration data 406 is sent to and from the projector 404 via an Ethernet 100 base$^T$ or 10 base$^T$ twisted-pair cable 418 or a RS-232 cable 416. A second example would be where both the configuration data 406 and video 408 are sent to the projector 404 using a HD-SDI cable 414.

Figure 5:
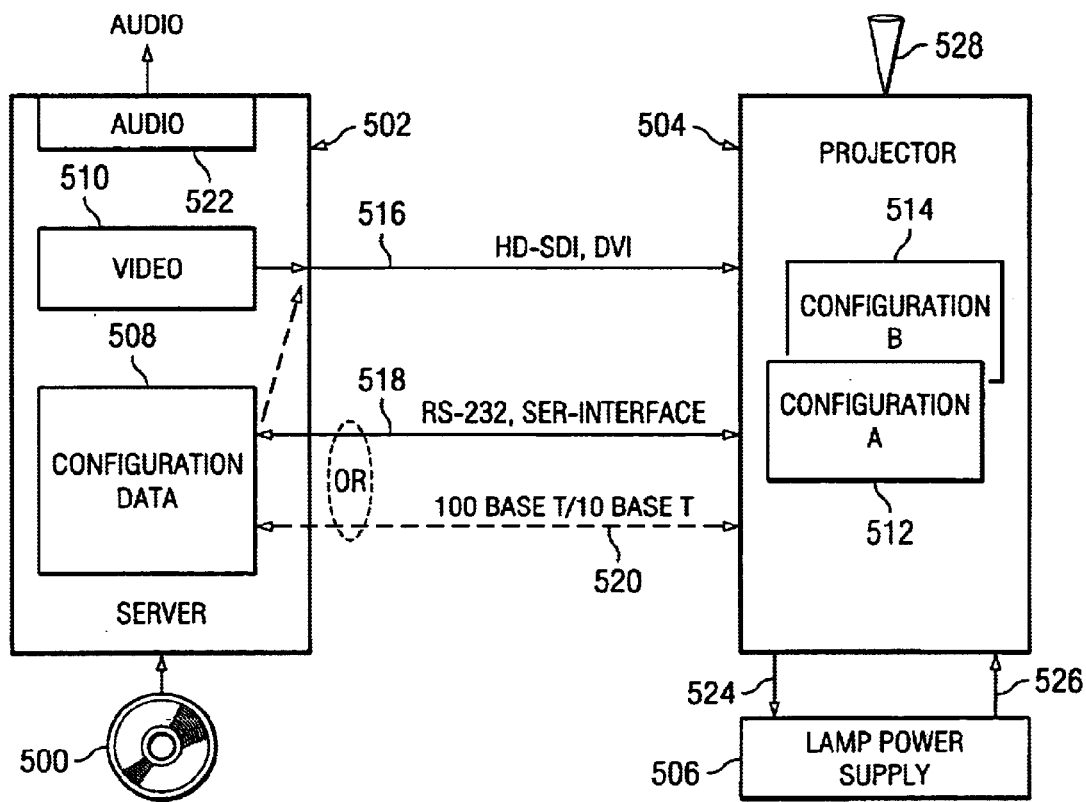
FIG. 5 is a block diagram of a digital cinema projection system that incorporates dynamic lamp modulation.

FIG. 5 is an example of a digital cinema projection system, which further incorporates a dynamic lamp modulation function. This is comprised of a media source 500 coupled to a server 502, a projector 504, a lamp power supply 506, and interconnecting interfaces 516/518 or 520. The server 502 supplies configuration data 508, video 510, and audio 522 to the system. The projector 504 has a double-buffered memory configuration, Config. A 512 and Config. B 514, which holds the current and the next configuration packet data, as described in FIG. 3. In this case the configuration data 508 includes relative luminance information for video 510, which is used by the projector 504, along with associated time stamps, to dynamically modulate the lamp power supply 506 and control the lamp brightness. Finally, the projected light 528, which has been modulated by the spatial light modulator(s) is projected on to a display screen. In operation, a luminance level feedback signal 524 is coupled from the projector 504 to the lamp power supply 506 and used to modulate the current 526 going to the lamp, located in the projector.

The luminance level feedback signal 524 enables the projector to control the lamp power supply 506 based on the received image data or configuration data. For example, relatively dark scenes can use the luminance level feedback signal 524 to reduce the output of the lamp. With a reduced lamp output, longer PWM bit periods are necessary to produce the same image brightness. Therefore the bit depth of the system is effectively increased without the need to generate shorter bits, allowing darker images without generating false contours. The data may be adjusted to compensate for the reduced lamp power either during the mastering process or by the projector during the projection process.

While this invention has been described in the context of a preferred embodiment, it will be apparent to those skilled in the art that the present invention may be modified in numerous ways and may assume embodiments other than that specifically set out and described above. Accordingly, it is intended by the appended claims to cover all modifica-

What is claimed is:

1. A method for providing cinema projector configuration data, said method comprising:
   embedding said configuration data in a digital cinema transport stream;
   said embedded configuration data being operable:
   to assure proper configuration setup of every projector according to an authored distributed data; and
   to permit on-the-fly changes to said projector configuration, thereby providing a proprietary characteristic look to the projected image content, based on an authored reference image.

2. The method of claim 1, wherein identical configuration data to that of the authored reference image projector is delivered to each projector, said configuration data being embedded in the video stream.

3. The method of claim 1, wherein said configuration data can be changed by a provider on a frame-by-frame basis to match the characteristics of said authored reference image.

4. The method of claim 1, wherein a clock is provided along with said configuration data, said clock providing parameters taken from the group consisting of hours, minutes, seconds, and frame number.

5. The method of claim 1, wherein projector parameters that can be modified by means of said configuration data are selected from the group comprised of gamma tables, color management system data, relative luminance level, format of sampled data, range of sampled data, 2D/3D presentation information, frame rate, image size, aspect ratio, font tables, and subtitle, sub-image, or caption information.

6. The method of claim 5, wherein said color management system parameters contain the group comprised of color temperature, color primaries of encoded image data, and 3D color look-up-tables.

7. The method of claim 5, wherein said format of sampled data is selected from the group comprised of RGB or YCrCb and 4:2:2 chroma sampling, 4:4:4 chroma sampling, or 4:2:0 chroma sampling.

8. The method of claim 5, wherein said relative luminance level is adjusted according to said embedded configuration data by modulating the projector's lamp, thereby improving the dynamic range of said projected image.

9. The method of claim 8, wherein said lamp modulation increases the dynamic range of said projected image to provide more bits of gray-scale resolution of said projected image.

10. An embedded transport stream for digital cinema projection systems, comprising:
    one or more frames of video data, followed by sequential audio and an embedded configuration data packet;
    said embedded configuration data packet being operable:
    to assure proper configuration setup of multiple projectors according to the authored distributed data; and
    to permit on-the-fly changes to said projector configuration, thereby providing a proprietary characteristic look to the projected image content, based on the authored reference image.

11. The transport stream of claim 10, wherein said configuration data packet structure is comprised of:
    a sub-packet header/identifier;
    a sub-packet type identifier; and
    one or more sub-packet data sets.

12. The transport stream of claim 11, wherein said sub-packet data sets are selected from a group comprised of gamma tables, color management system data, relative luminance level, format of sampled data, range of sampled data, 2D/3D presentation information, frame rate, image size, aspect ratio, font tables, and subtitle, sub-image or caption information.

13. The transport stream of claim 12, wherein said color management system parameters contain the group comprised of color temperature, color primaries of encoded image data, and 3D color look-up-table data.

14. The transport stream of claim 12, wherein said sampled data format is selected from the group comprised of RGB or YCrCb and 4:2:2 chroma sampling, 4:4:4 chroma sampling, or 4:2:0 chroma sampling.

15. The transport stream of claim 13, wherein said color look-up-tables can be made proprietary to individual filmmakers.

16. The transport stream of claim 12, wherein said luminance level is adjusted according to said embedded configuration data by modulating the projector's lamp power, thereby improving the dynamic range of said projected image.

17. The transport stream of claim 16, wherein said lamp modulation increases the dynamic range of said projected image to provide more bits of gray-scale resolution of said image.

18. The transport stream of claim 12, wherein said 3D/2D presentation information comprises additional headers and flags.

19. The transport stream of claim 12, wherein said frame rate can be changed on-the-fly, thereby providing various special effects in said projected image.

20. A digital cinema projection system with embedded transport data, comprising:
    a media source;
    said media source coupled to a server;
        said server being capable of distributing configuration data, video, audio, sub-image and sub-title insertion data;
    said server being coupled to one or more remote cinema projectors;
    said projectors having a double buffered configuration data memory;
        said configuration data memory containing said system setup data on a frame-by-frame basis;
    said embedded data being operable:
        to assure proper configuration setup of every projector according to the authored distributed data; and
        to permit on-the-fly changes to said projector configuration, thereby providing a proprietary characteristic look to the projected image content, based on the authored reference image.

21. The system of claim 20, wherein said server is coupled to said projector by means of two channels:
    a high-definition serial digital interface coaxial cable carrying said video; and
    a RS-232 serial cable carrying said configuration data.

22. The system of claim 20, wherein said server is coupled to said projector by means of two channels:
    a high-definition serial digital interface coaxial cable carrying said video; and
    an Ethernet, 100 base$^T$ or 10 base$^T$, twisted-pair cable carrying said configuration data.

23. The system of claim 20, wherein identical configuration data to that of the authored reference image projector is delivered to each projector, said configuration data being embedded in the video stream.

24. The system of claim 20, wherein said configuration data can be changed by the provider on a frame-by-frame basis to match the characteristics of said reference image.

25. The system of claim 24, wherein the projector parameters that can be modified by means of said configuration data are selected from the group comprised of gamma tables, color management system data, relative luminance level, format of sampled data, range of sampled data, 2D/3D presentation information, frame rate, image size, aspect ratio, font tables, and subtitle, sub-image or caption information.

26. The system of claim 25, wherein said color management system parameters contain the group comprised of color temperature, color primaries of encoded image data, and 3D color look-up-tables.

27. The system of claim 25, wherein said luminance level is adjusted according to said embedded configuration data by modulating the projector's lamp power, thereby improving the dynamic range of said projected image.

28. The system of claim 27, wherein said lamp modulation increases the dynamic range of said projected image to provide more bits of gray-scale resolution of said image.

29. The system of claim 20, wherein said configuration data packet structure is comprised of:
   a sub-packet header/identifier;
   a sub-packet type identifier; and
   one or more sub-packet data sets.

* * * * *